United States Patent

Wier et al.

[11] Patent Number: 5,499,536
[45] Date of Patent: Mar. 19, 1996

[54] METHOD FOR DETECTING COMBUSTION MISFIRES IN A PLURALITY OF CYLINDERS

[75] Inventors: Manfred Wier, Wenzenbach; Stefan Krebs; Wolfgang Reupke, both of Regensburg; Anton Angermaier, Landshut, all of Germany

[73] Assignee: Siemens Aktiengesellschaft, Munich, Germany

[21] Appl. No.: 267,806

[22] Filed: Jun. 28, 1994

[30] Foreign Application Priority Data

Jun. 28, 1993 [EP] European Pat. Off. .............. 93110262

[51] Int. Cl.$^6$ .................................................. G01M 15/00
[52] U.S. Cl. ..................................... 73/117.3; 364/431.08
[58] Field of Search .................................... 73/116, 117.3; 364/431.08; 123/419, 436

[56] References Cited

U.S. PATENT DOCUMENTS

| | | | |
|---|---|---|---|
| 5,263,365 | 11/1993 | Müller et al. | 73/117.3 |
| 5,268,843 | 12/1993 | Imai | 364/431.08 |
| 5,269,178 | 12/1993 | Vigmostad et al. | 73/116 |
| 5,275,037 | 1/1994 | Nakayama et al. | 73/117.3 |
| 5,287,282 | 2/1994 | Imai | 364/431.08 |
| 5,287,737 | 2/1994 | Osawa et al. | 73/117.3 |
| 5,307,671 | 5/1994 | Akase | 73/117.3 |
| 5,309,756 | 5/1994 | Osawa et al. | 73/116 |
| 5,331,848 | 7/1994 | Nakagawa et al. | 73/116 |
| 5,337,240 | 8/1994 | Nakagawa et al. | 73/117.3 |
| 5,345,817 | 9/1994 | Grenn et al. | 73/117.3 |

FOREIGN PATENT DOCUMENTS

| | | |
|---|---|---|
| 4100527 | 7/1992 | Germany . |
| 4118580 | 12/1992 | Germany . |
| 5033717 | 2/1993 | Japan . |
| 2256491 | 12/1992 | United Kingdom . |

Primary Examiner—Richard Chilcot
Assistant Examiner—Eric S. McCall
Attorney, Agent, or Firm—Herbert L. Lerner; Laurence A. Greenberg

[57] ABSTRACT

A method for detecting combustion misfires includes calculating engine roughness values from fluctuations in crankshaft rpm, comparing the values with threshold values, and forming cylinder groups having an increased likelihood of misfiring. During a period of observation, each engine roughness value calculated for each cylinder is separately compared with a first threshold value and with a second threshold value being reduced in comparison with the first threshold value, a first counting sum associated with the cylinder is formed if the first threshold value is exceeded, and a second counting sum associated with the cylinder is formed if the second threshold value is exceeded. After the period of observation has elapsed, if the total sums of all of the first or second counting sums exceed a predeterminable total sum limit value, group sums are formed for each cylinder group from the second counting sums, and a conclusion is drawn as to the occurrence of a multi-cylinder misfire in the group having the higher group sum if the second counting sums of the individual cylinders in a group are approximately of equal magnitude, and conversely, if the second counting sums of the various cylinders are different, a conclusion is drawn as to a single-cylinder combustion misfire for the cylinder having the highest first counting sum, if the total sum of the first counting sums exceeds a predeterminable total sum limit value.

10 Claims, 4 Drawing Sheets

METHOD FOR DETECTING COMBUSTION MISFIRES IN A PLURALITY OF CYLINDERS

BACKGROUND OF THE INVENTION

Field of the Invention

The invention relates to a method for detecting combustion misfires, and in particular to a method that makes it possible to detect misfires with high reliability even when combustion misfires occur in a plurality of cylinders.

In order to detect combustion misfires, methods that evaluate the fluctuations in crankshaft rpm caused by the misfire are employed, among others. One such method is described in German Published, Non-Prosecuted Application DE 41 00 527 A1, for example. In that method, so-called engine roughness values are calculated, in which disturbances that could lead to misdetections, such as acceleration or deceleration of the vehicle, are already more or less well compensated for. Those engine roughness values are then compared with threshold values, and if those threshold values are exceeded, a combustion misfire is detected. Even though the engine roughness values are calculated in a sometimes quite complicated way, which is intended to preclude the disturbances as much as possible, misdetections repeatedly occur, or in other words, combustion misfires are indicated even though in fact none are actually occurring, or else no combustion misfires are indicated even though in fact they are occurring. The danger of non-detection is especially high if combustion misfires are occurring in a plurality of cylinders, or more specifically, if in a four-stroke internal combustion engine, combustion misfires occur in a plurality of cylinders during two rotations of the crankshaft. The term "multi-cylinder misfires" is used below to describe such an occurrence. In multi-cylinder misfires, the engine roughness values are less than with single-cylinder misfires. The threshold values must therefore be lowered in order to still detect such multi-cylinder misfires. One such method is described in German Published, Non-Prosecuted Application DE 41 18 580 A1. In the method described therein:

- engine roughness values for single-cylinder misfires are determined in an arbitrary way;
- a current engine roughness threshold value at a given time, which is valid for single-cylinder misfires, is determined as a function of the current operating state of the engine;
- the engine roughness threshold value is lowered if multi-cylinder misfires are detected; and
- a conclusion is drawn that misfires are occurring in the applicable cylinder if the engine roughness value for that cylinder exceeds the lowered engine roughness threshold value. Multi-cylinder misfires are then detected as follows:
- engine roughness values for single cylinders are determined in an arbitrary way;
- a predetermined number of summation terms that each come with the same algebraic sign are engine roughness values or differences between such values, which are added together; and
- a conclusion is drawn that a multi-cylinder misfire is occurring if at least one sum exceeds a predetermined threshold sum value.

Summary of the Invention:

It is accordingly an object of the invention to provide a method for detecting combustion misfires in a plurality of cylinders, which overcomes the hereinafore-mentioned disadvantages of the heretofore-known methods of this general type and which makes it possible to detect single-cylinder and multi-cylinder misfires with even greater reliability and with less load on the computer performing the evaluation.

With the foregoing and other objects in view there is provided, in accordance with the invention, in a method for detecting combustion misfires, which includes calculating engine roughness values from fluctuations in crankshaft rpm, comparing the values with threshold values, and forming cylinder groups having an increased likelihood of misfiring, the improvement which comprises, during a period of observation, separately comparing each engine roughness value calculated for each cylinder with a first threshold value and with a second threshold value being reduced in comparison with the first threshold value, forming a first counting sum associated with the cylinder if the first threshold value is exceeded, and forming a second counting sum associated with the cylinder if the second threshold value is exceeded; and after the period of observation has elapsed, if the total sums of all of the first or second counting sums exceed a predeterminable total sum limit value, forming group sums for each cylinder group from the second counting sums, and drawing a conclusion as to the occurrence of a multi-cylinder misfire in the group having the higher group sum if the second counting sums of the individual cylinders in a group are approximately of equal magnitude, and conversely, if the second counting sums of the various cylinders are different, drawing a conclusion as to a single-cylinder combustion misfire for the cylinder having the highest first counting sum, if the total sum of the first counting sums exceeds a predeterminable total sum limit value. Accordingly, the object of the invention is attained by providing that the engine roughness values, which are calculated for each cylinder by an arbitrary method, are each compared separately with a normally high threshold value, of the kind which is used for single-cylinder combustion misfiring detection, and with a threshold value that is reduced as compared with that threshold value, wherein the latter is of the kind which is used for detecting multi-cylinder misfires. If the respective threshold values are exceeded, then associated sum counters are increased. This is done over a relatively long period of observation, for instance over 2000 combustions. At the end of the period of observation, if the total sums exceed a predetermined limit value, then by comparison of the individual sums it is ascertained whether a multi-cylinder misfire or a single-cylinder misfire is involved, and which cylinder or cylinders are affected by the misfire or misfires.

To that end, the cylinders are combined into groups of increased likelihood of misfire, or in other words groups that belong together functionally, for example in the case of bankwise injection, the cylinders that are supplied with fuel from a common injection device, or in the case of a double spark ignition coil, the cylinders that are supplied with ignition energy by that ignition coil. In a multi-cylinder misfire, or in other words if all of the cylinders of that group have a combustion misfire, the total sum of the combustion misfire counter belonging to that group is substantially higher than the total sum of the combustion misfire counter for a different cylinder group.

However, this kind of group difference could also be due to a single misfire in that group. In order to investigate this, the numbers of misfires of the cylinders of one group are compared with one another. In the number of misfires within a group is approximately the same, then the conclusion can be drawn that a group misfire has occurred. However, if the numbers of misfires deviates sharply from one another then a single misfire is suspected. However, since the ascertainment of misfires is carried out at reduced threshold values, then in order to avoid misdetections, the sums of misfires in which the engine roughness values of these cylinders were compared with the non-reduced threshold value are also studied. Among the sums of misfires of all of the cylinders, the highest sum is ascertained, and a single-cylinder misfire for the associated cylinder is recorded. In addition to this maximum value ascertainment, the other misfire sums can also be compared with a predeterminable sum limit value, and a single-cylinder combustion misfire can also be indicated for the sake of cylinders having sums which exceed this limit value.

In accordance with another mode of the invention, there is provided a method which comprises also drawing a conclusion as to a single-cylinder combustion misfire for the cylinders having first counting sums exceeding a predeterminable sum limit value, if the second counting sums of the individual cylinders are different.

In accordance with a further mode of the invention, there is provided a method which comprises no longer carrying out an investigation for multi-cylinder misfires and instead only determining the single misfiring cylinder, if only the total sum of the first counting sums exceeds the total sum limit value.

In accordance with an added mode of the invention, there is provided a method which comprises no longer carrying out an investigation for single-cylinder combustion misfires and instead only performing an investigation for multi-cylinder misfires, if only the total sum of the second counting sums exceeds the total limit value.

In accordance with an additional mode of the invention, there is provided a method which comprises taking the non-reduced and the reduced engine roughness threshold values from a performance as a function of current operating variables of the engine, such as load or rpm.

In accordance with yet another mode of the invention, there is provided a method which comprises calculating the reduced engine roughness threshold value from the non-reduced engine roughness threshold value by multiplication by a factor between 0 and 1.

In accordance with yet a further mode of the invention, there is provided a method which comprises forming one cylinder group with each of the cylinders belonging to one injection device, in an engine with bank injection.

In accordance with a concomitant mode of the invention, there is provided a method which comprises forming one cylinder group with each of the cylinders being supplied with ignition energy by a double spark ignition coil.

Other features which are considered as characteristic for the invention are set forth in the appended claims.

Although the invention is illustrated and described herein as embodied in a method for detecting combustion misfires in a plurality of cylinders, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DESCRIPTION OF THE PREFERRED EMBODIMENTS

Figure 1A:
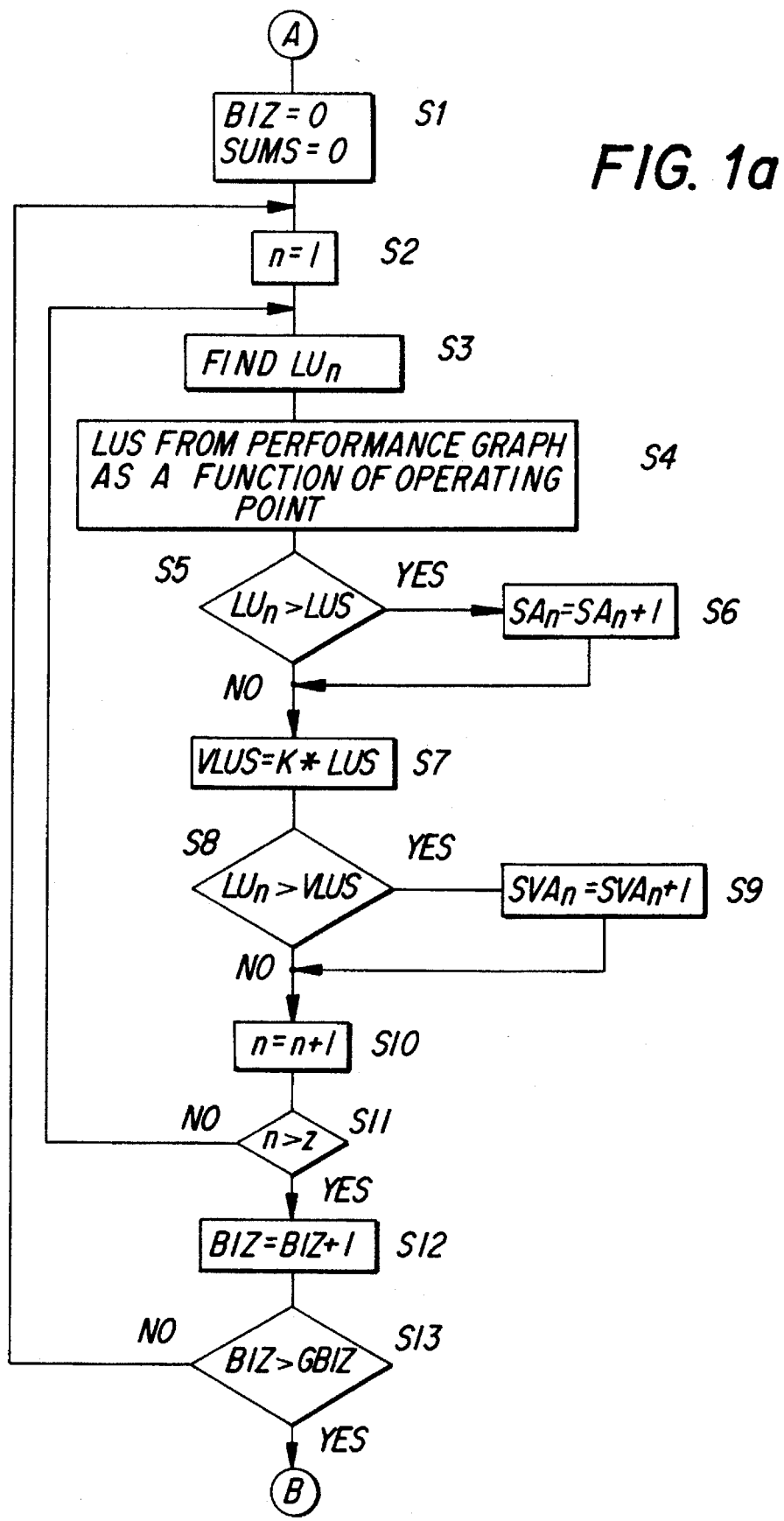
FIGS. 1a and 1b are flow charts showing a first exemplary embodiment of the method.

The drawing figures illustrate the course of the method of the invention by taking a four-cylinder engine as an example, in which two groups of cylinders are formed. Group 1 has cylinders 1 and 3, and group 2 has cylinders 2 and 4. It is also assumed that the engine roughness values when combustion misfires occur assume a positive value, and accordingly then exceed positive limit values. If a method is employed that furnishes negative engine roughness values if combustion misfires occur, then the limit values must also be chosen to be negative, and a check must be made for values that fall below these limit values.

Referring now to the figures of the drawing in detail and first, particularly, to FIG. 1a thereof, it is seen that at a start A of the method, in a step S1, all step counters are set to zero, and in particular a counter BIZ, which counts combustion cycles during a period of observation. The ensuing method steps are carried out in succession for all of the cylinders. To that end, first, in a method step S2, a cylinder counter n is sent to the value 1. In a method step S3, an engine roughness value $LU_n$ is then ascertained by some arbitrary method, as was already mentioned above in the introduction to the specification. In a method step S4, an engine roughness threshold value LUS that depends on the current operating state of the engine, for instance on the load and the rpm, is taken from a performance graph. The engine roughness threshold value LUS ascertained above is compared with the engine roughness value $LU_n$. If the engine roughness value $LU_n$ is greater than the engine roughness threshold value LUS, then a sum counter $SA_n$ belonging to that cylinder is incremented by one in a method step S6. However, if the engine roughness value $LU_n$ is less than or equal to the threshold value LUS, then without incrementing the counter a jump is made to a method step S7, in which a reduced threshold value VLUS is ascertained, either from a further performance graph or from the original engine roughness value LUS read out of the performance graph, by multiplication with a factor k that is between 0 and 1. The factor k is ascertained empirically in advance on a test bench for the particular engine. The reduced engine roughness threshold value VLUS is necessary so that combustion misfires can also be detected with multi-cylinder misfires, in which the engine roughness values are lower than in single-cylinder misfires.

Figure 1B:
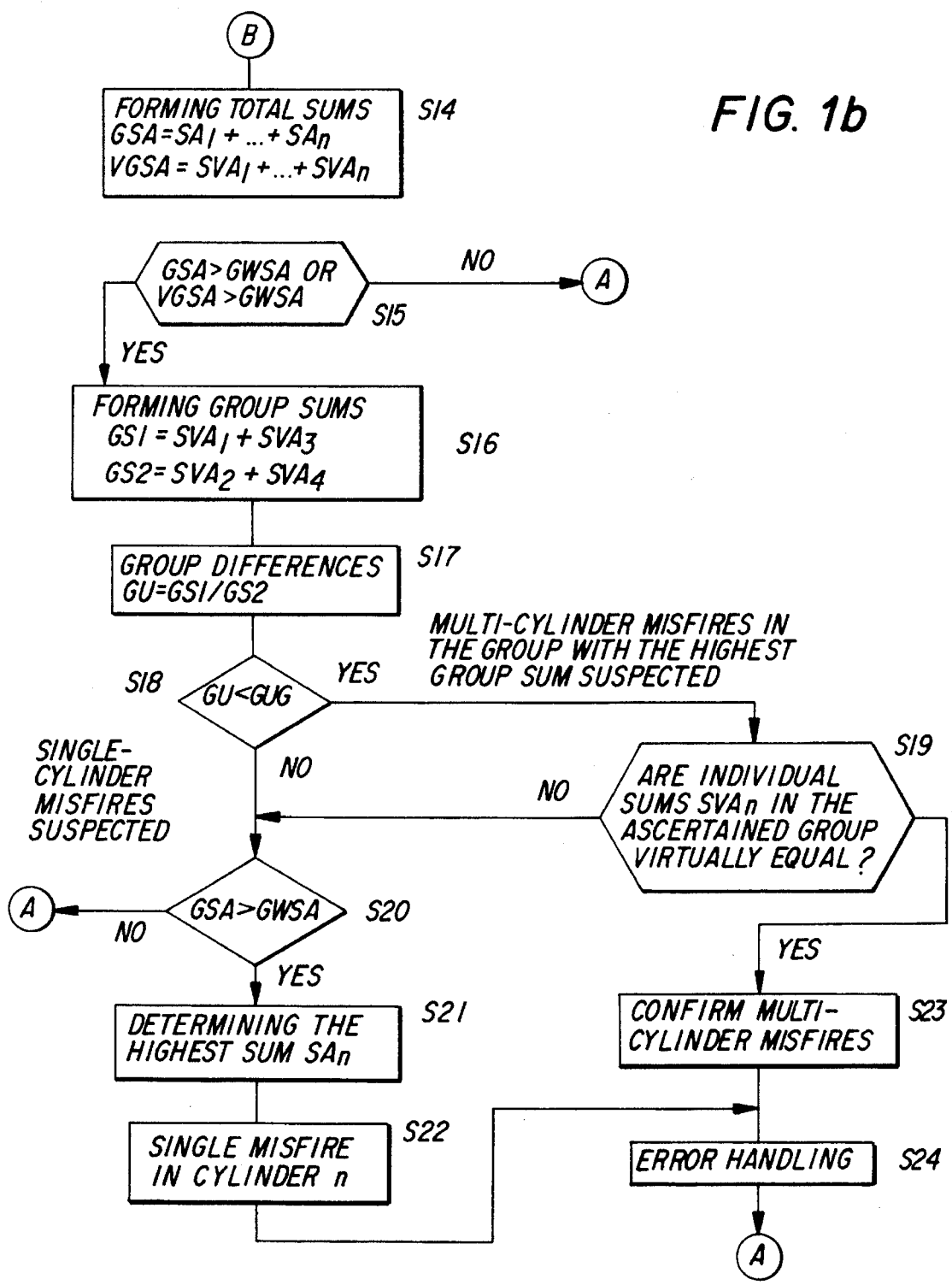

In a method step S8, the engine roughness value $LU_n$ is compared with the reduced engine roughness threshold value VLUS. The engine roughness value $LU_n$ that is calculated for the individual cylinders is accordingly compared with both the non-reduced engine roughness threshold value LUS and the reduced engine roughness value VLUS, since at this stage in the method it is not yet possible to ascertain whether a single-cylinder combustion misfire or a multi-cylinder misfire is involved. If the engine roughness value $LU_n$ is greater than the reduced engine roughness threshold value VLUS, then an associated sum counter $SVA_n$ is incremented by one in a method step S9. However, if the engine roughness value is less than or equal to the threshold value, then without incrementing the sum counter, one proceeds directly to a method step S10, where the cylinder counter n is incremented by one. This calculation of the engine roughness values and the comparison with the threshold values is carried out for all of the cylinders. Once that has been done, then in a method step S11 it is determined if the cylinder counter n is greater than Z. If not, a return is made to the step S3. If so, one proceeds on to a method step S12, and the combustion cycle counter BIZ is incremented by one. If the period of observation has elapsed, then in a method step S13 a jump is made to a point B in FIG. 1b, where an evaluation of the sums ascertained during the period of observation is performed.

In a method step S14, a total sum GSA is first formed from all of the individual sums $SA_n$ that were obtained by comparison of the engine roughness values $LU_n$ with the non-reduced engine roughness threshold value LUS. A total sum VGSA is also formed from all of the individual sums $SVA_n$ that were obtained by comparison of the engine roughness values $LU_n$ with the reduced engine roughness threshold value VLUS. Evaluation is performed only if at least one of these sums GSA, VGSA is greater than a predeterminable limit value GWSA, as is seen in a method step S15. If not, then a return is made to the start A of the method in FIG. 1b.

However, if so, then in a method step S16, initially for the cylinders of one cylinder group at a time, the group sums are formed from the individual sums belonging to the cylinders that were ascertained by the comparison of the engine roughness values with the reduced engine roughness threshold values. In other words, in the exemplary embodiment, a group sum GS1 for group one, to which cylinders 1 and 3 belong, is formed by adding individual sums $SVA_1$ and $SVA_3$ together. In the case of group two, to which cylinders 2 and 4 belong, a group sum GS2 is formed by adding individual sums $SVA_2$ and $SVA_4$ together. If the group sums of the groups are quite different, then a multi-cylinder misfire is suspected in the group that has the higher number of misfires. To that end, in a method step S17, a group difference GU is ascertained by dividing the smaller group sum (GS1 is assumed as an example) by the larger group sum (GS2 in this example), and then in a method step S18, this group difference GU is compared with a group difference limit value GUG. If the value is less than the limit value, or in other words if the group differences are great, then a multi-cylinder misfire is suspected in the group with the higher group sum. However, such a group difference could also be caused by a single-cylinder misfire. An investigation is therefore performed in a method step S19 as to whether or not the individual sums $SVA_n$ in the cylinder group in which a multi-cylinder misfire is suspected are approximately of equal magnitude, for instance by again dividing the smaller individual sum by the larger individual sum and comparing the result with a further limit value. If the sums are virtually equal, then the multi-cylinder misfire of this group is confirmed in a method step S23 and reported to an error handling block in a method step S24, and a return is made to the start A of the method in FIG. 1a. However, if the individual sums are of different magnitudes in the comparison in the method step S19, then a single-cylinder misfire is suspected for the cylinder having an individual sum which is noticeably high. In order to avoid a misdetection, since this sum formation was performed by comparison with the reduced engine roughness threshold value, which was actually not intended for detecting single-cylinder misfires, the sums $SA_n$ are additionally used, which were formed by comparison of the engine roughness values of the cylinders having the non-reduced engine roughness threshold value LUS. A jump is made to a method step S20. One also arrives at this method step if the group difference value was greater than or equal to the group difference limit value GUG, in the method step S18. In other words, if the group sum values are virtually equal, then a single-cylinder misfire is suspected. Determination of the single misfire takes place in the method step S20 only if the total sum GSA is greater than the total sum limit value GWSA. In order to check and identify the misfiring cylinder, the maximum sum value is then ascertained in a method step S21 from the misfire sum values $SA_n$ that were obtained by comparison of the engine roughness values with the non-reduced engine roughness threshold value LUS. In a method step S22, a single misfire of the cylinder to which this sum value belongs is ascertained. The result is reported to the error handling block in a method step S22, and a return is made to the start A of the method in FIG. 1a.

Figure 2A:
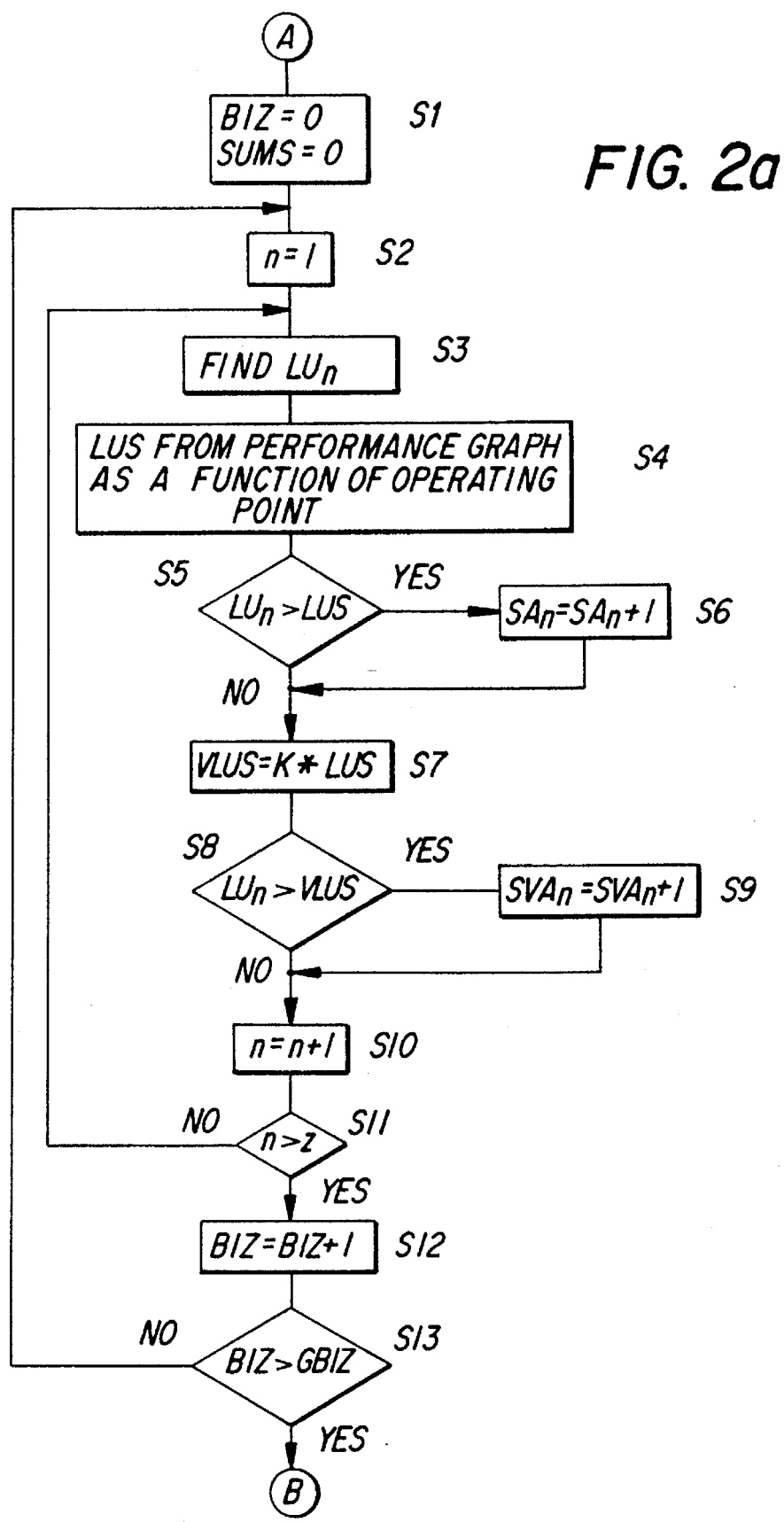
FIGS. 2a and 2b are flow charts showing a further embodiment of the method of the invention, which leads to an even lesser load on a computer performing the evaluation.
Figure 2B:
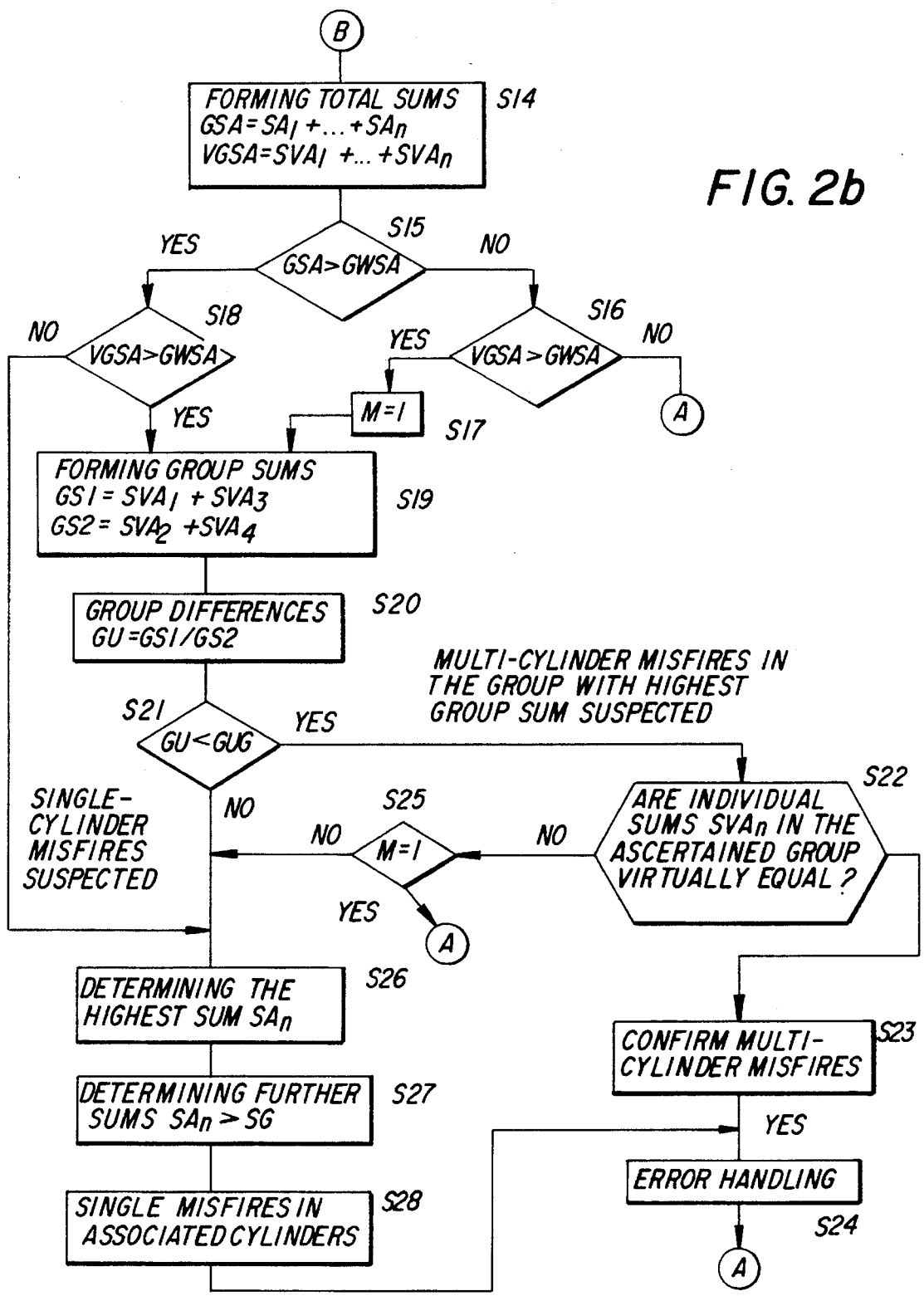

FIGS. 2a and 2b show a further embodiment of the method of the invention.

The calculation of the engine roughness values, the comparison with the limit values, and the incrementing of the corresponding sum counters, are equivalent to the method steps in the method just described and shown in FIG. 1a. In the evaluation of the sums, as is shown in FIG. 2b, a total sum GSA is again first formed in a method step S14 from all of the individual sums $SA_n$ that were obtained by comparison of the engine roughness values $LU_n$ with the non-reduced engine roughness threshold value LUS. A total sum VGSA is likewise formed from all of the individual sums $SGA_n$ that were obtained by comparison of the engine roughness values $LU_n$ with the reduced engine roughness threshold value VLUS.

Then, in a method step S15, the first total sum GSA is compared with a total sum limit value GWSA. If the first total sum GSA is less than or equal to the total sum limit value GWSA, then a jump is made to a method step S16. There, a second total sum VGSA is compared with the total sum limit value. If the total sum VGSA is less than or equal to the total sum limit value GWSA, then the assumption is that in fact no combustion misfire has occurred, and a return is made to the start A of the method in FIG. 2a. However, if the total sum VGSA is greater than the total sum limit value GWSA, then a flag or indicator M is put in place, and one then proceeds to a method step S19.

If the first total sum GSA is greater than the total sum limit value GWSA in the method step S15, then a jump to a method step S18 is made. There, the second total sum VGSA is again compared with the total sum limit value GWSA. If the total sum VGSA is less than or equal to the total sum limit value GWSA, it means that only a single misfire can possibly be occurring. A jump is made directly to a method step S26, in order to determine which cylinder is misfiring.

However, if the total sum VGSA is greater than the total sum limit value GWSA in the method step S18, then one proceeds to a method step S19.

In the method step S19, for each respective cylinder group, group sums are first formed from the individual sums pertaining to the cylinders. These individual sums were ascertained from the comparison of the engine roughness values with the reduced engine roughness threshold values. In the exemplary embodiment, the group sum GS1 is thus formed for group one which includes cylinders 1 and 3 by addition of the individual sums $SVA_1$ and $SVA_3$. In the case of group two, to which cylinders 2 and 4 belong, the group sum GS2 is formed by adding together the individual sums $SVA_2$ and $SVA_4$.

If the group sums of the groups are highly different, then a multi-cylinder misfire is suspected, in the group that has a higher number of misfires. To that end, in a method step S20, the group difference GU is ascertained by dividing the smaller group sum (GS1 is assumed as an example) by the larger group sum (GS2 in this example), and then in a method step S21, this group difference GU is compared with the group difference limit value GUG. If the value is less than the limit value, or in other words if the group differences are great, then a multi-cylinder misfire is suspected in the group with the higher group sum. However, such a group difference could also be caused by a single-cylinder misfire An investigation is therefore performed in a method step S22 as to whether or not the single sums $SVA_n$ in the cylinder group in which a multi-cylinder misfire is suspected are approximately of equal magnitude, for instance again by dividing the smaller group sum by the larger group sum and comparing the result with a further limit value. If the sums are virtually equal, then the multi-cylinder misfire of this group is confirmed in a method step S23 and reported to an error handling block in a method step S24, and a return is made to the start A of the method in FIG. 1a. However, if the individual sums are of different magnitudes in the comparison in the method step S22, then a single-cylinder misfire is suspected for the cylinder having an individual sum which is noticeably high. In order to avoid a misdetection, since this sum formation was done by comparison with the reduced engine roughness threshold value, which was actually not intended for detecting single-cylinder misfires, the sums $SA_n$ are additionally used, which were formed by comparison of the engine roughness values of the cylinders having the non-reduced engine roughness threshold value LUS. A jump is made to a method step S26. First, however, a check is also made in a method step S25 as to whether or not the flag M is in place. If this flag in place, this means that the first total sum GSA was not above the limit value GWSA, and thus no single-cylinder misfire is possible. Since it was found in the method step S22 that no multi-cylinder misfire is present either, no combustion misfire whatever is occurring, and a return is made to the start A of the method in FIG. 2a. If the flag M is not in place, then one proceeds to a method step S26. One also arrives at this method step if the group difference value was greater than or equal to the group difference limit value GUG in the method step S21. In other words, if the group sum values are virtually equal, then a single-cylinder misfire is suspected. In order to check and identify the misfiring cylinder or cylinders, the maximum sum value is then ascertained from the misfire sum values $SA_n$ that were obtained by comparison of the engine roughness values with the non-reduced engine roughness threshold value LUS. In a method step S27, further sum values are ascertained that are above a predetermined limit value SG. In a method step S28, a single-cylinder combustion misfire is ascertained for the cylinder or cylinders to which these sums pertain. The results are reported to the error handling block in the method step S24, and a return is again made to the start A of the method in FIG. 2a.

We claim:

1. In a method for detecting combustion misfires, which includes calculating engine roughness values from fluctuations in crankshaft rpm, comparing the values with threshold values, and forming cylinder groups having an increased likelihood of misfiring, the improvement which comprises:

during a period of observation:

separately comparing each engine roughness value calculated for each cylinder with a first threshold value and with a second threshold value being reduced in comparison with the first threshold value, forming a first counting sum associated with the cylinder if the first threshold value is exceeded, and forming a second counting sum associated with the cylinder if the second threshold value is exceeded; and after the period of observation has elapsed, if total sums of all of the first or second counting sums exceed a predeterminable total sum limit value:

forming group sums for each cylinder group from the second counting sums, and drawing a conclusion as to the occurrence of a multi-cylinder misfire in the group having a higher group sum if the second counting sums of the individual cylinders in a group are approximately of equal magnitude, and conversely, if the second counting sums of the various cylinders are different, drawing a conclusion as to a single-cylinder combustion misfire for the cylinder having the highest first counting sum, if the total sum of the first counting sums exceeds a predeterminable total sum limit value.

2. The method according to claim 1, which comprises also drawing a conclusion as to a single-cylinder combustion misfire for the cylinders having first counting sums exceeding a predeterminable sum limit value, if the second counting sums of the individual cylinders are different.

3. The method according to claim 1, which comprises no longer carrying out an investigation for multi-cylinder misfires and instead only determining the single misfiring cylinder, if only the total sum of the first counting sums exceeds the total sum limit value.

4. The method according to claim 1, which comprises no longer carrying out an investigation for single-cylinder combustion misfires and instead only performing an investigation for multi-cylinder misfires, if only the total sum of the second counting sums exceeds the total limit value.

5. The method according to claim 1, which comprises taking the non-reduced and the reduced engine roughness threshold values from a performance as a function of current operating variables of the engine.

6. The method according to claim 1, which comprises taking the non-reduced and the reduced engine roughness threshold values from a performance as a function of a current load of the engine.

7. The method according to claim 1, which comprises taking the non-reduced and the reduced engine roughness threshold values from a performance as a function of a current rpm of the engine.

8. The method according to claim 1, which comprises calculating the reduced engine roughness threshold value from the non-reduced engine roughness threshold value by multiplication by a factor between 0 and 1.

9. The method according to claim 1, which comprises forming one cylinder group with each of the cylinders belonging to one injection device, in an engine with bank injection.

10. The method according to claim 1, which comprises forming one cylinder group with each of the cylinders being supplied with ignition energy by a double spark ignition coil.

* * * * *